(12) United States Patent
Hütter et al.

(10) Patent No.: US 7,079,756 B2
(45) Date of Patent: Jul. 18, 2006

(54) STORAGE MEDIUM AND METHOD FOR PROCESSING DATA OF SUCH STORAGE MEDIUM

(75) Inventors: Ingo Hütter, Pattensen (DE); Wulf-Christian Streckenbach, Hemmingen (DE); Marco Winter, Hannover (DE); Johannes Böhm, Göttingen (DE); Kai Dorau, Hemmingen (DE); Dietmar Hepper, Hannover (DE); Jens Spille, Hemmingen (DE); Hans-Joachim Platte, Hemmingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1150 days.

(21) Appl. No.: 09/804,576

(22) Filed: Mar. 12, 2001

(65) Prior Publication Data
US 2001/0025286 A1 Sep. 27, 2001

(30) Foreign Application Priority Data
Mar. 25, 2000 (EP) .................................. 00250101

(51) Int. Cl.
*H04N 5/85* (2006.01)
*H04N 9/79* (2006.01)
(52) U.S. Cl. ........................................ 386/125; 386/45
(58) Field of Classification Search ................ 386/125, 386/124, 126, 105, 106, 95, 46, 45, 40, 70, 386/82, 1
See application file for complete search history.

(56) References Cited

U.S. PATENT DOCUMENTS

| 6,466,735 B1 * | 10/2002 | Kozuka et al. ............. 386/126 |
| 6,519,217 B1 * | 2/2003 | Kawashima et al. ....... 369/53.2 |
| 6,674,438 B1 * | 1/2004 | Yamamoto et al. ......... 345/501 |

FOREIGN PATENT DOCUMENTS

| EP | 0508762 A2 | 10/1992 |
| EP | 0508762 A2 * | 10/1992 |
| EP | 0737912 A2 | 10/1996 |
| EP | 0936601 A1 | 8/1999 |

OTHER PUBLICATIONS

Copy of Search Report.

* cited by examiner

*Primary Examiner*—Robert Chevalier
(74) *Attorney, Agent, or Firm*—Joseph J. Laks; Robert B. Levy; Jorge Tony Villabon

(57) ABSTRACT

The invention relates to a storage medium on which a set of data is stored, whereby a first data section of the data set is stored in a read-only memory area and a second data section of the data set is stored in a read/write memory area, and the data set comprises language-independent data and language-dependent data. The data set can be processed in a handling device either in a first processing form related to a first language, or in a different processing form related to a second language. Language-independent data and language-dependent data which are related to the first language are included in the first data section, and language-dependent data which are related to the second language are included in the second data section. For the processing in different form, data from the second data section as well as data from the first data section are to be used.

6 Claims, 1 Drawing Sheet

STORAGE MEDIUM AND METHOD FOR PROCESSING DATA OF SUCH STORAGE MEDIUM

FIELD OF THE INVENTION

The invention relates to an optical storage medium on which one part of the set of data is stored in a ROM memory area and another part of the set of data is stored in a RAM memory area, and to a method for processing data on such a storage medium.

BACKGROUND OF THE INVENTION

Optical storage media are used as recording media for information, for example for image and sound data or computer programs and application software. The document EP-A-0 309 721 discloses an optical recording medium representing a combination of a read-only CD and a magneto-optical read/write disk. In the case of the known recording medium, the read-only memory area is formed from recesses, so-called pits in a light-reflective aluminium layer. The known storage medium is used for storing maps, for example. For this application instance, it is proposed that non-variable data be stored in the region of the read-only memory area, formed by the recesses, while variable data is arranged in the read/write memory area, which is formed in the magneto-optical disk area.

More advanced optical storage media having a read-only memory area (ROM area) and a read/write memory area (RAM area) are based on DVD technology (digital versatile disc).

SUMMARY OF THE INVENTION

Optical storage media are usually used to store large volumes of data, for example application software or audio/video data. On account of the complexity and the size of applications today, the need for sufficient storage capacity is continually rising in this area. By way of example, there would be a very large storage requirement if a movie having a plurality of synchronous languages or subtitles containing these languages were to be stored on the optical storage medium. On account of the limited storage space on the storage medium, however, it is usually possible to supply only a few different synchronous languages on the storage medium between which the user of the optical storage medium can choose. In this context, these languages are usually the most widespread languages, such as English, Spanish etc. However, it is only economically worthwhile to produce storage media—for example optical DVD storage media—if sufficiently large numbers are produced. For this reason, it is currently not worth producing DVD storage media containing synchronous languages for relatively small countries. A similar problem exists if a piece of application software comprising a multiplicity of individual modules for matching individual customer requirements is to be stored on the optical storage medium. Matching the individual customer requirements gives rise to various processing forms for the application software. The limited storage capacity of the storage medium means that modules which are not required sufficiently often by the customers are not supplied on the storage medium, with the result that the number of processing forms is limited.

The problem to be solved by of the invention is to provide a storage medium on which a set of data is stored or can be stored such that it can also be produced economically when there are large volumes of data and complex or rare applications, and also a corresponding method for producing or for writing to such a storage medium.

An essential advantage of the invention is that the storage medium, which is an optical storage medium, for example, and has a set of data stored on it which can be evaluated, for example, by means of a computer device or an audio/video playback device, can be produced in large numbers such that only data from one set of application data is stored on the optical storage medium, said data being required for any type of application for the stored set of application data, irrespective of the specific type of application or processing form. This data not specific to any application type is stored in the read-only memory area. A storage medium holding the data not specific to any application type can be produced economically in mass production in a first step. Data in the set of application data which is specific to one application type can then be stored on the optical storage medium subsequently. This reduces the costs for producing optical storage media with respective applications stored on them.

In one advantageous development of the invention, at least part of the dependent data in the set of data, which dependent data can be used either for the at least partial processing of the set of data in the first processing form or for the at least partial processing of the set of data in the at least one other processing form, is included in the other part of the set of data, which part is stored in the read/write memory area. This makes it possible to modify or to supplement the processing-form-dependent data on the optical storage medium by writing and erasing.

In one embodiment of the invention, which is preferred with regard to optimized interchangeability of the dependent data, the dependent data in the set of data is all included in the other part of the set of data, which is stored in the read/write memory area.

In one advantageous embodiment, the independent data all comprises language-independent data in the set of data, and the dependent data all comprises language-dependent data in the set of data, the language-independent data and the language-dependent data being processed by an evaluation device or handling device such that the first processing form and the at least one other processing form can differ at least in terms of a language used in the context of the respective processing form, which permits economical production of optical storage media of the type on which language-dependent sets of data are stored. For example, FIG. 2 depicts a flow chart of an embodiment of such processing of data read from a storage medium of FIG. 1. As depicted in FIG. 2, independent data from part A of the storage medium of FIG. 1 can be processed either in a first processing form related to one language or in a second processing form related to another language.

In one development of the invention, which is preferred for the use of the optical storage medium in the area of consumer electronics, the first processing form and the at least one other processing form differ at least in terms of the language or a plurality of languages used in the context of the respective processing form for image or text reproduction and/or sound reproduction. By way of example, the set of data may comprise a movie, with at least some of the dependent data being processed by means of the handling device to produce language-dependent screen subtitles, and it thus being possible to produce a storage medium having a movie stored on it as an economical mass product onto which language-dependent subtitles can be placed later, for example by another company or by a consumer.

In one development of the invention which is expedient for a language-controlled handling device, the first processing form and the at least one other processing form differ at least in terms of the language used in the context of the respective processing form for the handling device's language control.

In connection with the use of the storage medium for storing computer software, the first processing form and the at least one other processing form may advantageously correspond to processing one module combination of an application software product and to processing another module combination of the application software product, which comprises at least part of the first module combination.

In this context, the independent data all comprises module-independent data, in the set of data, which is of the type necessary for processing the first module combination and the other module combination, and the dependent data all comprises module-dependent data, in the set of data, which is of the type necessary for processing the first module combination or for processing the other module combination.

In the context of producing or later modifying the storage medium, the storage medium may be easily matched to various applications if at least some of the dependent data is retrieved from a communication network—for example from the Internet—and is stored on the storage medium.

DETAILED DESCRIPTION OF PREFERRED EMBODIMENTS

In the context of modern application or evaluation or handling devices, the storage medium is advantageously a DVD or a CD or a Minidisc.

Figure 1:
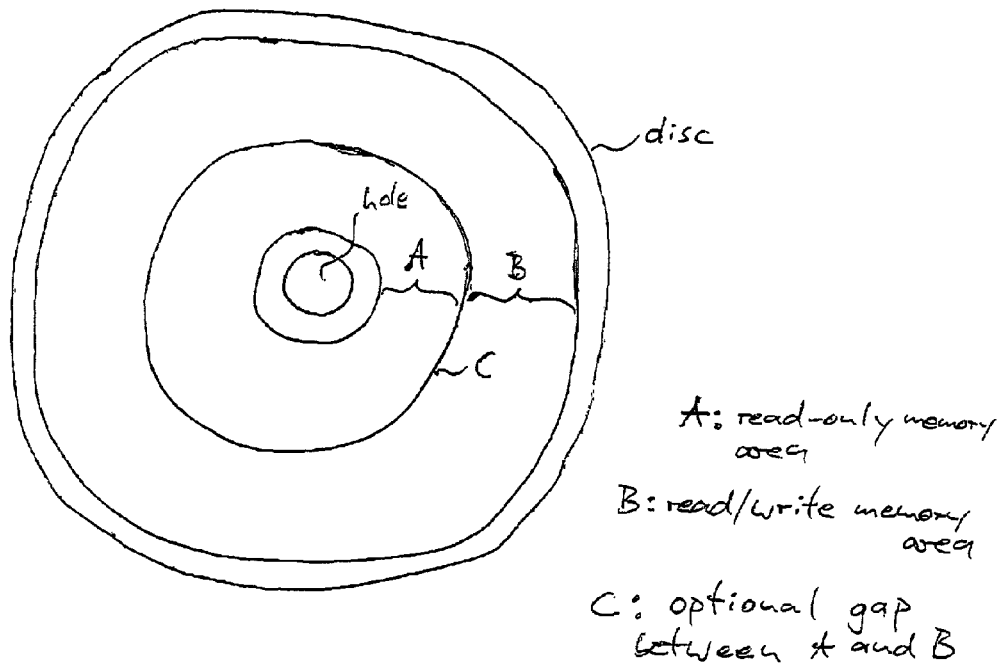
FIG. 1 depicts a disk storage medium with exemplary read only memory area A and read write memory area B. Areas A and B are optionally separated by gap area C.
Figure 2:
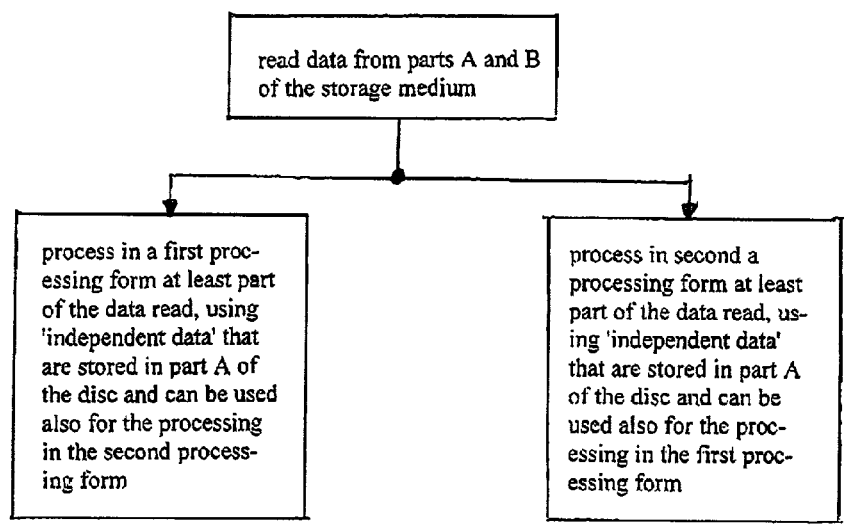
FIG. 2 is a flow chart which depicts the processing of data read from the storage medium of FIG. 1.

An appropriate optical storage medium, e.g. a RAM/ROM-DVD, is designed to have at least one read-only memory area and at least one read/write memory area. For example, FIG. 1 depicts an optical storage disc comprising a read-only memory area, A, a read/write memory area, B, and an optional gap, C, between A and B.

By way of example, a movie is stored on the storage medium in the form of a set of data. In this case, the set of data comprises language-independent and language-dependent data, the language-dependent data permitting a synchronous language to be output when the movie is played back, so that the movie can be played back in the national language of the particular viewer. In this case, the language-independent data comprises the image data, for example, playback of which is independent of the national language. The language-independent data is stored on the storage medium in the read-only memory area. Part or all of the language-dependent data can be stored in the read/write memory area. If part of the language-dependent data is stored in the read/write area, other language-dependent data is stored in the read-only memory area. When the language-dependent data is split between the read-only memory area and the read/write memory area, the language-dependent data can be sorted according to language, so that the data for some languages is stored in the read-only memory area and the data for other languages is stored in the read/write memory area.

A storage medium configured in this manner allows a producer of the storage medium to write the language-independent data to the read-only memory area. A distributor or the user of the storage medium is subsequently able to store the language-dependent data on the storage medium himself. In this context, a particular user-friendly feature for the user is if the user is able to retrieve the language-dependent data from the Internet and then stores it on the optical storage medium for the purpose of watching the movie later.

The description above related to a storage medium in which a distinction was drawn between language-dependent and language-independent stored data. However, the data stored on the storage medium may also be a set of data which is a software product which can be executed using a computer device. Thus, for example, it may be a word processing program. Generally, such a word processing program comprises a basic module and additional modules, which are used to permit additional functions, such as spelling checks. In such a case, the basic module is preferably stored in the read-only memory area of the storage medium, so that the optical storage medium can be produced with the basic module as part of mass production. Depending on the user requirements, the distributor or the user of the software product can then store at least some additional modules in the read/write memory area. In this case too, provision may be made for the additional modules to be retrieved from the Internet before storage on the storage medium, and for them to be subsequently transferred to the storage medium.

What is claimed is:

1. Method for processing a set of data stored on a storage medium on which a first data section of said set of data is stored in a read-only memory area of said storage medium and a second data section of said set of data is stored in a read/write memory area of said storage medium, wherein said set of data includes language-independent data and language-dependent data, and whereby in a handling device at least a part of said set of data is processed either in a first processing form related to a first language, or is processed in at least one other processing form different from said first processing form and related to a second language different from said first language, the processing form actually used being selected by means of said handling device, and wherein language-independent data and language-dependent data which are related to said first language are included in said first data section, and language-dependent data which are related to said second language are included in said second data section, and wherein in said at least one other processing form, data from said second data section as well as data from said first data section are processed.

2. Method according to claim 1, wherein said storage medium comprises at least one of a DVD, a CD and a Minidisc.

3. Method according to claim 1, wherein said handling device comprises at least one of a computer, a video playback device and an audio playback device.

4. Method according to claim 1, wherein said set of data comprises a movie and the related video data and language-dependent audio data which are related to said first language are included in said first data section and language-dependent data which are related to said second language are included in said second data section.

5. Method according to claim 2, wherein said set of data comprises a movie and the related video data and language-dependent audio data which are related to said first language are included in said first data section and language-dependent data which are related to said second language are included in said second data section.

6. Method according to claim 1, wherein at least some of the data items for said second data section are retrieved from a communication network.

\* \* \* \* \*